United States Patent [19]

Kurokawa et al.

[11] Patent Number: 5,515,678

[45] Date of Patent: May 14, 1996

[54] BRAKE PRESSURE GENERATING DEVICE FOR A VEHICLE

[75] Inventors: Takashi Kurokawa, Nagoya; Michiharu Nishii, Toyota, both of Japan

[73] Assignee: Aisin Seiki Kabushiki Kaisha, Kariya, Japan

[21] Appl. No.: 360,579

[22] Filed: Dec. 21, 1994

[30] Foreign Application Priority Data

Dec. 22, 1993 [JP] Japan .................................. 5-324795

[51] Int. Cl.[6] ...................................................... F15B 7/00
[52] U.S. Cl. ................................................ 60/591; 60/592
[58] Field of Search .............................. 60/561, 562, 583, 60/585, 589, 591, 592

[56] References Cited

U.S. PATENT DOCUMENTS

| | | | |
|---|---|---|---|
| 4,078,384 | 3/1978 | Shutt | 60/591 X |
| 4,170,386 | 10/1979 | Shutt | 60/591 X |
| 4,745,750 | 5/1988 | Belart et al. | 60/591 X |
| 5,005,350 | 4/1991 | Reinartz et al. | 60/562 |
| 5,081,841 | 1/1992 | Nishii | 60/591 X |

FOREIGN PATENT DOCUMENTS

| | | |
|---|---|---|
| 51-114563 | 10/1976 | Japan . |
| 1530014 | 10/1978 | United Kingdom . |
| 1580368 | 12/1980 | United Kingdom . |
| 2170874 | 8/1986 | United Kingdom . |

Primary Examiner—Hoang Nguyen
Attorney, Agent, or Firm—Burns, Doane, Swecker & Mathis

[57] ABSTRACT

A brake pressure generating device for a vehicle includes a cylinder body, a pressure source connected with the cylinder body for generating a pressure, a first piston slidably disposed in the cylinder body for being operated by a brake pedal of the vehicle, a sleeve member disposed in the cylinder body for forming a pressure chamber with the first piston at one end thereof and for being exposed to a regulated pressure chamber at the other end thereof, and a spool valve slidably disposed in the sleeve member for regulating the pressure of the pressure source. A second piston is slidably disposed in the sleeve member for receiving the pressure in the pressure chamber at one end thereof and for being connected with the spool valve to impart a force the spool valve. An elastic member is disposed in the cylinder body and receives a pressure in the regulated pressure chamber. A reaction member is connected with the spool valve at one end thereof and is in contact with the elastic member at the other end thereof.

15 Claims, 2 Drawing Sheets

BRAKE PRESSURE GENERATING DEVICE FOR A VEHICLE

BACKGROUND OF THE INVENTION

1. Field of the Invention

This invention relates to a brake system, and more particularly to a brake pressure generating device for a vehicle for applying a brake pressure to wheels of the vehicle.

2. Description of the Related Art

A conventional brake pressure generating device for a vehicle is disclosed in Japanese Patent Laid Open No. 51(1976)-114563. This brake pressure generating device for a vehicle comprises a piston slidably disposed in a cylinder body for forming a pressure chamber and connected with a brake pedal, and a spool valve disposed in the cylinder body for regulating the pressure of a pressure source. The regulated pressure regulated by the spool valve is introduced into an auxiliary pressure chamber which is located behind the piston so as to boost up the piston pressure.

In accordance with this known device, because the spool valve is exposed to the pressure in the pressure chamber and the regulated pressure at opposite ends thereof so as to regulate the pressure of the pressure source, the regulated pressure is approximately equal to the pressure in the pressure chamber (the losses attributable to spring loads being omitted). Therefore, the characteristic of the relationship between the pressure in the pressure chamber and the regulated pressure is represented by a straight line inclined at 45 degrees as shown in FIG. 3. Consequently, the regulated pressure cannot be moderately provided relative to the pressure in the pressure chamber. Further, since the characteristic of the pressure in the pressure chamber relative to the brake pedal operating force depends on only the diameter of the piston, the characteristic cannot be changed or varied according to the particular characteristics of a given vehicle.

SUMMARY OF THE PRESENT INVENTION

It is an object of the present invention to provide a brake pressure generating device for a vehicle which can alter the characteristic of the pressure in the pressure chamber relative to the brake pedal operating force.

It is another object of the present invention to provide a brake pressure generating device for a vehicle which is simple in construction and low in cost.

It is a further object of the present invention to provide a brake pressure generating device for a vehicle which is small in size and light in weight.

It is a further object of the present invention to provide a brake pressure generating device for a vehicle which can be easily manufactured.

It is a further object of the present invention to provide a brake pressure generating device for a vehicle which is durable.

To achieve the above mentioned objects, a brake pressure generating device for a vehicle in accordance with this invention comprises a cylinder body, a pressure source connected with the cylinder body for generating a pressure, a piston slidably disposed in the cylinder body for being operated by a brake pedal of the vehicle, a spool valve slidably disposed in the cylinder body for forming a pressure chamber with the piston at one end thereof and for regulating the pressure of the pressure source and restriction means which receives a regulated pressure from the spool valve at one end thereof and connected with the other end of the spool valve at the other end thereof for varying a characteristic of a relation between a pressure in the pressure chamber and the regulated pressure.

BRIEF DESCRIPTION OF THE DRAWING FIGURES

The features and advantages of the brake pressure generating device for a vehicle according to the present invention will be more clearly appreciated from the following detailed description considered in conjunction with the accompanying drawing figures wherein.

DETAILED DESCRIPTION OF A PREFERRED EMBODIMENT

Figure 1:
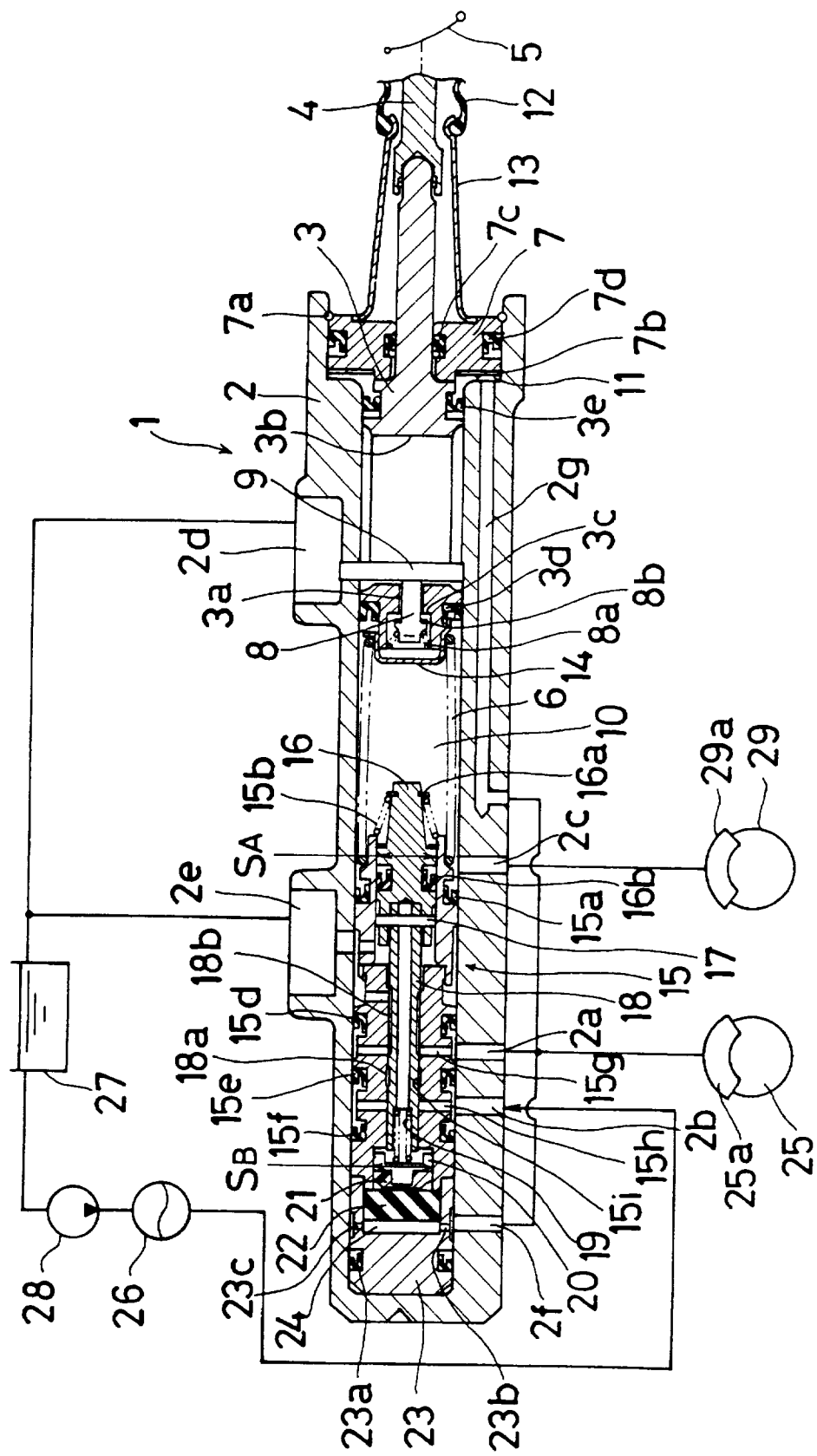
FIG. 1 is a sectional view of a brake pressure generating device for a vehicle of the present invention.

In accordance with FIG. 1, a brake pressure generating device 1 for a vehicle comprises a cylinder body 2 and a first piston 3 slidably disposed in the cylinder body 2. The first piston 3 is connected with a brake pedal 5 through a push rod 4. The first piston 3 is biassed by a return spring 6 so that the first piston 3 is in contact with a plate member 7 which is prevented from moving in the rightward direction by a snap ring 7a. A stopper 7b is disposed at the left side of the plate member 7 shown in FIG. 1 for limiting leftward movement of the plate member 7.

The first piston 3 includes a connecting passage 3a into which an inlet valve 8 is inserted. The inlet valve 8 is biassed by a spring 8a and is in contact with a pin 9 which is fixed to the cylinder body 2. The pin 9 is also inserted into a through hole 3b of the first piston 3. In the condition shown in FIG. 1, a valve portion 8b of the inlet valve 8 is not in contact with a valve seat 3c provided on the first piston 3.

Two seal cups 3d, 3e are mounted on the left and right portions respectively of the first piston 3. The plate member 7 includes an inner seal cup 7c and an outer seal cup 7d. With the above seal cups 3d, 3e, 7c and 7d, a pressure chamber 10 is formed at the left side of the first piston 3 and an auxiliary pressure chamber 11 is formed between the right side of the first piston 3 and the plate member 7.

A boot 12 is provided to separate the inside of the brake pressure generating device for a vehicle 1 from the outside of the device. A retainer 13 is connected with the boot 12 to support the boot 12 and to prevent the push rod 4 from radially inclining. Further, a cup retainer 14 engages the first piston 3 so as to connect the return spring 6 and the first piston 3, and to prevent the seal cup 3d from being disengaged from the first piston 3.

A sleeve member 15 is forced by the return spring 6 so as to be in contact with a left end portion of the cylinder body 2. The sleeve member 15 includes a seal cup 15a which forms the other end of the pressure chamber 10. A second piston 16 is slidably disposed in the sleeve member 15. The second piston 16 is biassed in the rightward direction relative to the sleeve member 15 by a piston spring 15b so as to be in contact with a stopper 15c. The piston spring 15b is also engaged with a snap ring 16a disposed on the second piston 16.

The second piston 16 includes a seal cup 16b for forming the pressure chamber 10 and for receiving the pressure in the pressure chamber 10 so as to be moved in the leftward direction shown in FIG. 1. The second piston 16 is connected with a spool valve 18 through a pin 17 so that the spool valve 18 is moved integrally with the second piston 16.

A piston return member 20 is connected with the left end of the spool valve 18 through a spring 19. A reaction member 21 which possesses a trapezoidal shaped configuration is mounted on the piston return member 20 so as to form a restriction means. The reaction member 21 is biassed by the spring 19 into contacting engagement with an elastic member 22 (made of rubber or the like) which also forms a part of the restriction means. In the illustrated embodiment, the short side of the trapezoidal configuration of the reaction member contacts the elastic member 22. A retainer 23 is fixed to the sleeve member 15 so as to prevent the sleeve member 15 from moving. The retainer 23 includes a seal cup 23a and passages 23b, 23c. The elastic member 22 forms a regulated pressure chamber 24 with the retainer 23.

The sleeve member 15 further includes seal cups 15d, 15e and 15f which are arranged in succession from the right to left. An outlet port 15g is disposed between the seal cups 15d, 15e for connection to a wheel brake 25a mounted on a rear wheel 25 of the vehicle. Further, an inlet port 15h is disposed between the seal cups 15e, 15f into which is introduced a brake fluid charged in an accumulator 26. The brake fluid is stored in a reservoir tank 27 and is pressurized by a fluid pump 28 in order to be charged into the accumulator 26. The outlet port 15g and the inlet port 15h are respectively connected with an outlet port 2a and an inlet port 2b disposed on the cylinder body 2. The cylinder body 2 includes an outlet port 2c connected to a wheel brake 29a mounted on a front wheel 29. Further, the cylinder body 2 includes inlet ports 2d, 2e both of which are connected to the reservoir tank 27.

The spool valve 18 includes a first groove 18a and a second groove 18b. The sleeve member 15 also includes a groove 15i. The outlet port 2a is connected to a port 2f which is connected to the regulated pressure chamber 24. The outlet port 2a is further connected to the auxiliary pressure chamber 11 through a passage 2g.

The operation of the brake pressure generating device 1 for a vehicle will be described hereinafter. When the brake pedal 5 is operated, the first piston 3 is moved in the leftward direction shown in FIG. 1 through the push rod 4. Therefore, since the inlet valve 8 is separated from the pin 9, the valve portion 8b contacts the valve seat 3c as a result of the elastic force of the spring 8a so as to separate the pressure chamber 10 from the reservoir tank 27.

Later, a brake pressure PM is generated in the pressure chamber 10 because of the decrease in capacity of the pressure chamber 10 according to the stroke of the piston 3. At this time, the second piston 16 receives a force PM×SA (SA: cross-sectional area of the second piston 16) so as to be moved in the leftward direction shown in FIG. 1 since the second piston 16 receives the brake pressure PM in the pressure chamber 10.

The spool valve 18 is moved integrally with the second piston 16 in the leftward direction because the spool valve 18 is fixed to the second piston 16 through the pin 17. Therefore, the spool valve 18 compresses the spring 19 so as to be in contacting engagement with the piston return member 20. The first groove 18a of the spool member 18 connects with the inlet port 15h of the sleeve member 15 as a result of the movement of the spool valve 18, thereby connecting the inlet port 15h and the groove 15i of the sleeve member 15 through the first groove 18a. On the other hand, the second groove 18b is connected to the groove 15i so as to connect the groove 15i and the outlet port 15g by way of the second groove 18b. Therefore, the inlet port 15h is connected to the outlet port 15g by the movement of the spool valve 18. Consequently, the brake pressure in the accumulator 26 is slowly introduced into the regulated pressure chamber 24 from the outlet port 2a through the port 2f because the inlet port 2b is connected to and in fluid communication with the outlet port 2a through the inlet port 15h, the first groove 18a, the groove 15i, the second groove 18b and the outlet port 15g.

The pressure in the regulated pressure chamber 24 forces the elastic member 22 so as to move the spool valve 18 in the rightward direction through the reaction member 21 and the piston return member 20 against the brake pressure PM in the pressure chamber 10. The spool valve 18 is balanced when the pressure forces which the spool valve 18 receives from the pressure chamber 10 and the regulated pressure chamber 24 are equal.

At this time, when the area of the elastic member 22 in contact with the reaction member 21 is represented by SV, a relation between the pressure PM in the pressure chamber 10 and a regulated pressure PR introduced into the regulated pressure chamber 24 from the accumulator 26 through the spool valve 18 is shown in the following formulation (the losses by the load of the return spring 6 or the like are omitted).

$$PM \times SA = PR \times SV$$

Therefore, the regulated pressure PR introduced into the regulated pressure chamber 24 is represented in the following manner.

$$PR = PM \times SA / SV$$

When the regulated pressure PR in the regulated pressure chamber 24 is not very large, the area SV of the elastic member 22 in contact with the reaction member 21 is not very large because the elastic member 22 is not strongly forced toward the reaction member 21. However, the area SV of the elastic member 22 becomes larger according to the increase of the regulated pressure PR until the area SV becomes a maximum value SB. Therefore, the characteristic of the relationship between the brake pressure PM in the pressure chamber 10 and the regulated pressure PR in the regulated pressure chamber 24 is represented by a calm or relatively smooth and gently curving characteristic curve X shown in FIG. 2. This characteristic can be variously altered or changed by changing the consistency of the elastic member 22 or by changing the shape of the portion of the reaction member 21 in contact with the elastic member 22.

When the area of the reaction member 21 in contact with the elastic member 22 becomes SB, the regulated pressure PR is represented by the following formulation.

$$PR = PM \times SA / SB$$

Figure 2:
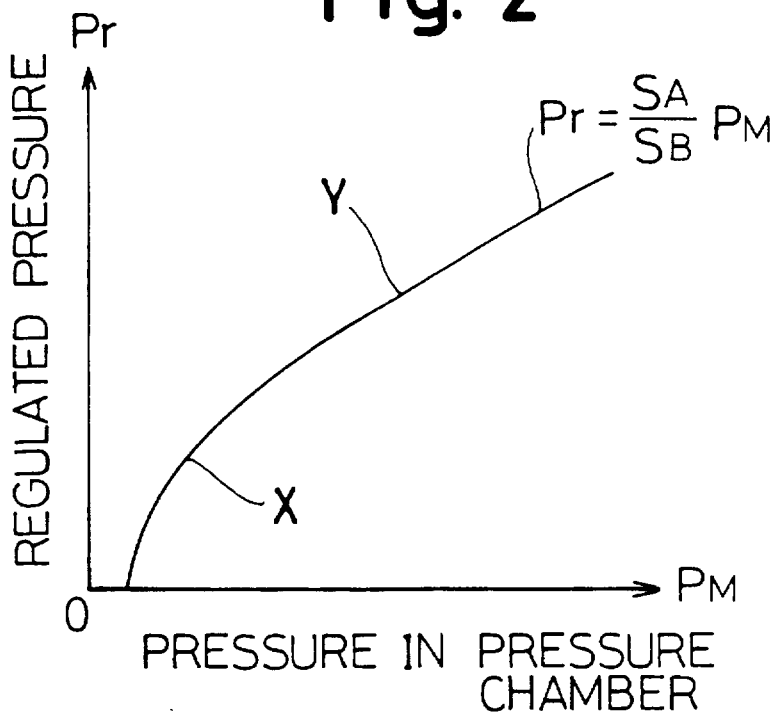
FIG. 2 is a characteristic curve showing a relationship between a pressure in the pressure chamber and a regulated pressure of the brake pressure generating device for a vehicle of the present invention.
Figure 3:
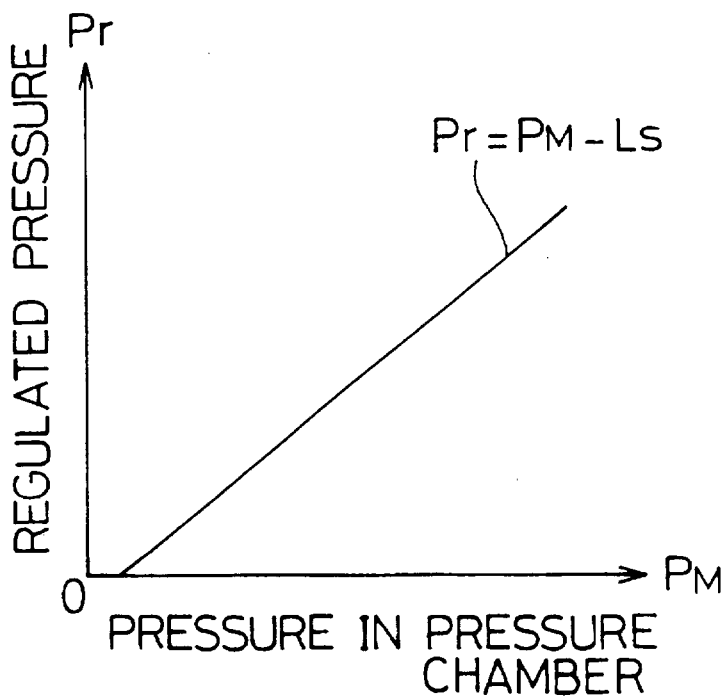
FIG. 3 is a characteristic curve showing a relationship between a pressure in the pressure chamber and a regulated pressure of a known brake pressure generating device for a vehicle.

From that point on, the regulated pressure PR increases linearly according to the increase of the brake pressure PM in the pressure chamber 10 because the values SA, SB are constant (See Y in FIG. 2). The characteristic of the relation between the regulated pressure PR and the brake pressure PM (shown by the inclination of the line Y of FIG. 2) is varied by variations in the sectional areas SA, SB of the second piston 16 and the reaction member 21. Therefore, the characteristic of the brake pressure PM in the pressure chamber 10 relative to a brake pedal operating force can be varied.

The regulated pressure PR introduced into the regulated pressure chamber 24 from the accumulator 26 through the spool valve 18 is transmitted to the wheel brake 25a mounted on the rear wheel 25 and to the auxiliary pressure chamber 11 through the passage 2g so as to boost up the operation of the first piston 3. The brake pressure PM in the pressure chamber 10 is supplied to the wheel brake 29a mounted on the front wheel 29.

While the invention has been particularly shown and described with reference to a preferred embodiment, it will be understood by those skilled in the art that the foregoing and other changes in form and details can be made therein, and equivalents employed, without departing from the spirit and scope of the invention.

What is claimed is:

1. A brake pressure generating device for a vehicle comprising:
   cylinder body;
   a pressure source connected with the cylinder body for generating a pressure;
   a piston slidably disposed in the cylinder body for being operated by a brake pedal of the vehicle;
   a spool valve having first and second ends, said spool valve being slidably disposed in the cylinder body for forming a pressure chamber with the piston at the first end of the spool valve and for regulating the pressure of the pressure source to produce a regulated pressure; and
   restriction means having a first end which receives the regulated pressure generated by the spool valve and a second end which is operatively associated with the second end of the spool valve for varying a characteristic of a relationship between a pressure in the pressure chamber and the regulated pressure.

2. A brake pressure generating device for a vehicle as recited in claim 1, wherein the restriction means includes an elastic member which defines a regulated pressure chamber that receives the regulated pressure and a reaction member, the reaction member having first and second ends, said reaction member being operatively associated with the spool valve at the first end of the reaction member and being in contact with the elastic member at the second end of the reaction member.

3. A brake pressure generating device for a vehicle as recited in claim 2, wherein the reaction member possesses a trapezoidal shaped configuration having a short side, the short side of the reaction member being in contact with the elastic member.

4. A brake pressure generating device for a vehicle as recited in claim 1, wherein said piston includes a passage in which is disposed an inlet valve for controlling communication between a brake fluid reservoir and the pressure chamber.

5. A brake pressure generating device for a vehicle as recited in claim 1, including a spring extending between the second end of the spool valve to the second end of the restriction means.

6. A brake pressure generating device for a vehicle as recited in claim 5, including another piston slidably disposed in the cylinder body, said another piston being connected to the spool valve.

7. A brake pressure generating device for a vehicle comprising:
   cylinder body;
   a pressure source connected with the cylinder body for generating a pressure;
   a first piston slidably disposed in the cylinder body for being operated by a brake pedal of the vehicle;
   a sleeve member disposed in the cylinder body for forming a pressure chamber with the first piston at one end of the sleeve member and for being exposed to a regulated pressure chamber at an opposite end of the sleeve member;
   a spool valve slidably disposed in the sleeve member for regulating the pressure of the pressure source;
   a second piston slidably disposed in the sleeve member for receiving a pressure in the pressure chamber at one end of the second piston and for being connected with the spool valve for imparting a force to the spool valve; and
   restriction means disposed in the cylinder body, said restriction means receiving at one end a pressure in the regulated pressure chamber and being operatively associated with the spool valve to impart a force to the spool valve.

8. A brake pressure generating device for a vehicle as recited in claim 7, wherein the restriction means includes an elastic member receiving a pressure in the regulated pressure chamber and a reaction member, the reaction member having first and second ends, the reaction member being operatively associated with the spool valve at one end of the reaction member and being in contact with the elastic member at the second end of the reaction member.

9. A brake pressure generating device for a vehicle as recited in claim 8, wherein the reaction member possesses a trapezoidal shaped configuration with a short side, the short side of the reaction member being in contact with the elastic member.

10. A brake pressure generating device for a vehicle as recited in claim 7, wherein said first piston includes a passage in which is disposed an inlet valve which is openable and closable to control communication between a brake fluid reservoir and the pressure chamber, the inlet valve being closed upon operation of the brake pedal.

11. A brake pressure generating device for a vehicle as recited in claim 7, including a spring positioned between the spool valve and the restriction means.

12. A brake pressure generating device for a vehicle having a brake pedal, a fluid pump and a wheel brake, comprising:
   first pressure generating means for generating a first pressure in response to depression of the brake pedal;
   accumulator means for accumulating a second pressure generated by the fluid pump which is supplied to the wheel brake; and
   modulating means for generating a regulated pressure that is supplied to the wheel brake, said regulated pressure being generated on the basis of said first and second pressures, said modulating means including restriction means for producing a non-linear relationship between the first pressure and the regulated pressure.

13. A brake pressure generating device for a vehicle as recited in claim 12, wherein said modulating means also includes a spool valve, said restriction means including an elastic member and a reaction member, the reaction member having first and second ends, said reaction member being operatively associated with the spool valve at the first end of the reaction member and being in contact with the elastic member at the second end of the reaction member.

14. A brake pressure generating device for a vehicle as recited in claim 13, wherein the reaction member possesses a trapezoidal shaped configuration having a short side, the short side of the reaction member being in contact with the elastic member.

15. A brake pressure generating device for a vehicle as recited in claim 13, including a spring extending between an end of the spool valve and an end of the restriction means.

* * * * *